United States Patent [19]

Coyle, Jr. et al.

[11] Patent Number: 5,130,512

[45] Date of Patent: Jul. 14, 1992

[54] FABRICATION OF OPTICAL COMPONENTS UTILIZING A LASER

[76] Inventors: Richard J. Coyle, Jr., 4 Catbird Ct., Lawrenceville, N.J. 08648; Gary J. Grimes, 4120 E. 115th Pl., Thornton, Colo. 80233; Lawrence J. Haas, 1182 Cedar St., Broomfield, Colo. 80020; Anthony J. Serafino, 216 Dorchester Dr., Apt. 3B2, Cranbury, N.J. 08512; George J. Shevchuk, 18 Porsche Dr., Matawan, N.J. 07747

[21] Appl. No.: 605,751

[22] Filed: Oct. 30, 1990

Related U.S. Application Data

[62] Division of Ser. No. 454,603, Dec. 21, 1989, Pat. No. 4,989,936.

[51] Int. Cl.$^5$ .............................................. B23K 26/00
[52] U.S. Cl. .......................... 219/121.68; 219/121.69; 359/15
[58] Field of Search ....................... 219/621.68, 621.69; 350/96.15, 96.29

[56] References Cited

U.S. PATENT DOCUMENTS 4,989,936 2/1991 Coyle, Jr. et al. ............... 350/96.15
5,013,119 5/1991 Coyle, Jr. et al. ............... 350/96.16

Primary Examiner—C. L. Albritton

[57] ABSTRACT

A method for fabricating optical components in the cladding of an optical fiber bus by the utilization of a laser. An excimer laser fabricates either an optical coupler opening or an optical mode scrambler by ablatively removing the cladding from the optical core of an optical fiber bus without damaging the optical core. Either coupler housing or a mode scrambler housing is attached to the optical fiber bus where the coupler or mode scrambler is to be fabricated. The coupler housing is used to position the laser, secure and align a coupler fiber, and provide cavities for junction and cladding repair materials. The mode scrambler housing serves a similar purpose.

31 Claims, 6 Drawing Sheets

SECTION A-A

FABRICATION OF OPTICAL COMPONENTS UTILIZING A LASER

CROSS-REFERENCE TO RELATED APPLICATIONS

This is a Division of application Ser. No. 07/454,603 filed Dec. 21, 1989, and now U.S. Pat. No. 4,989,936.

TECHNICAL FIELD

This invention relates to the fabrication of optical components on an optical fiber bus and, in particular, to the fabrication of reproducible openings and patterns in the cladding of the optical fiber bus.

BACKGROUND OF THE INVENTION

The difficulty of fabricating efficient linear optical couplers on an optical fiber bus with highly controlled coupler ratios involves the complete removal of the cladding that surrounds the core of the optical fiber bus at the coupler site as well as the precise placement of components at the coupler site. The size, shape, position, and cleanliness of the cladding removal is critical in making a good linear optical coupler. Similar problems exist for the fabrication of optical mode scramblers. Further, it is important that the optical fiber core not be damaged during the cladding removal, and that the fabrication method have a low cost per coupler or mode scrambler.

Mechanical stripping methods are known for fabricating coupler openings or mode scrambler patterns in the cladding. These methods physically scrape the cladding from the core; however, such stripping often does not achieve the correct opening size and shape, and frequently damages the core at the coupler or mode scrambler site, thus reducing the efficiency and strength of the optical fiber bus. Also, mechanical stripping techniques often leave cladding particles at the coupler site, and further, do not allow for precise placement of components at the coupler site.

In addition to mechanical stripping, chemical etching has been utilized to remove the cladding from the optical core. Chemical etching techniques are limited because of difficulties in achieving the correct opening size and shape, in accurately positioning the site defining mask, and in controlling the etching.

U.S. Pat. No. 4,626,652 discloses a method for fabricating optical couplers that uses a laser to remove all but a thin layer of the cladding from two fibers and then uses heat to fuse the two fibers together. If the cladding normally propagates the energy from the laser, the method requires the cladding to be treated or coated with a substance, such as a dye, to prevent the laser beam from penetrating the core of the fiber. Further, the laser beam disadvantageously scans back and forth across the region to prevent total removal of the cladding.

Mode scramblers have been fabricated in various ways. In U.S. Pat. No. 4,676,594, a mode scrambler is achieved by making a deformation, such as a groove or a notch, on one side of the optical fiber bus orthogonal to the longitudinal axis. The patent discloses etching or mechanical machining that produces the groove or notch in the optical fiber cladding.

Another optical fiber mode scrambler is disclosed in, for example, the articles "Measurement of Baseband Frequency Response of Multimode Fiber By Using A New Type of Mode Scrambler" by M. Tokuda et al. in "Electronic Letters," 3rd March 1977, Vol. 13, No. 5 at pages 146–147; and "Transmission Characteristics Of Multimode W-Type Optical Fiber: Experimental Study Of The Effect Of The Intermediate Layer" by K. Mikoshiba et al. in "Applied Optics," Vol. 17, No. 17, Sept. 17, 1978, at pages 2836–2841. In these articles the disclosed mode scrambler includes an optical fiber comprising specific sinusoidal serpentine bends.

Another form of an optical fiber mode scrambler is disclosed in, for example, the articles "Mode Scrambler For Optical Fibers" by M. Ikeda et al. in "Applied Optics," April 1977, Vol. 16, No. 4, at pages 1045–1049; and "Mode Scrambling Can Enhance Fiber Optic System Performance" by S. L. Storozum in "Electronics," Feb. 24, 1981, Vol. 4, No. 54, at pages 163–166. The mode scrambler in these articles comprises a few fibers in a bundle surrounded by a heat shrinkable tube which when shrunk causes fiber microbending.

Star couplers for providing mode scrambling are also well known and comprise a first plurality of fibers interconnected to a second plurality of fibers by means of a mixing element either comprising a planar waveguide section or formed by twisting and fusing the twisted waveguides together. In this regard see, for example, U.S. Pat. Nos. 4,362,357 and 4,449,783 or *Fundamentals Of Optical Fiber Communications* by M. K. Barnoski, 2nd Edition, Academic Press, 1981, at pages 337–339.

U.S. Pat. No. 4,749,248 discloses devices for coupling optical power from and/or into optical fiber. This patent discloses the use of a photorefractive effect to change the refraction index of the core of a single mode fiber in order to transfer energy from bound modes to so-called tunneling leakly modes (TL). The TL modes can then be removed from the cladding of the fiber guide with the aid of a dielectric body in contact with the fiber at a downstream point that has a refractive index approximately equal to or greater than index of refraction of the cladding. The photorefractive effect requires that the core be doped with an appropriate dopant (e.g., Fe or Bi) and constantly exposed to light of the appropriate wavelength. If the light is removed, the index of refraction returns to its original state. In addition, this patent proposes the use of a photoelastic effect to vary the refractive index of the core using a light that induces stresses in the core.

The problem that exists in the art is to provide a technique for making effective couplers and mode scramblers on an optical fiber bus by removing the cladding from the optical core without damaging the core and also maintaining the proper size, shape, and accuracy of position.

SUMMARY OF THE INVENTION

The aforementioned problem is solved and a technical advance is achieved in the art for optical component fabrication by the utilization of a radiation source that ablatively removes cladding from the surface of an optical core without damaging the optical core. Advantageously, the ablative removal of cladding is used to form an optical mode scrambler pattern in the cladding or to form an optical coupler opening that allows an optical coupler to be fabricated. The radiation source is preferably an excimer laser which is precisely aimed and whose power is carefully controlled. The utilization of an excimer laser in this manner has been found to allow for the fabrication of optical coupler openings that are precisely located, have exact shapes, and are extremely clean of cladding particles. Also, the optical core is not damaged. Advantageously, the cladding is of a polymer material which can be easily ablatively removed by the excimer laser; and the optical core is of a material which cannot be substantially affected by the excimer laser.

In a preferred embodiment of the invention, a coupler housing is pre-positioned on the optical bus and has several functions: (1) it provides an alignment point for positioning the laser over an aperture in the housing at the coupler site; (2) it provides a positioning and support device for a coupler fiber which exactly aligns the coupler fiber with the coupler site; (3) it provides vents that allow the housing at the coupler fiber and coupler site to be filled with a junction media that physically secures the coupler fiber to the housing and communicates light to or from the optical bus core; (4) it provides a cavity in the region opposite the coupler site on the optical bus to allow repair of any cladding damage caused by the laser. Vents in this cavity allow the cavity to be filled with a material having substantially the same index of refraction as the cladding.

In another preferred embodiment of the invention, a mode scrambler housing is pre-positioned on the optical bus and has several functions: (1) it provides an alignment point for positioning the laser over an aperture in the housing at the mode scrambler site; (2) it provides vents that allow the housing at the mode scrambler site to be filled with a material that preserves the light transmission characteristics of the optical bus core; (3) it provides a cavity in the region opposite the mode scrambler site on the optical bus to allow repair of any cladding damage caused by the laser. Vents in this cavity allow the cavity to be filled with a material having substantially the same index of refraction as the cladding.

Other and further aspects of the present invention will become apparent during the course of the following description and by reference to the accompanying drawing.

BRIEF DESCRIPTION OF THE DRAWING

Referring now to the drawing.

DETAILED DESCRIPTION

Figure 1:
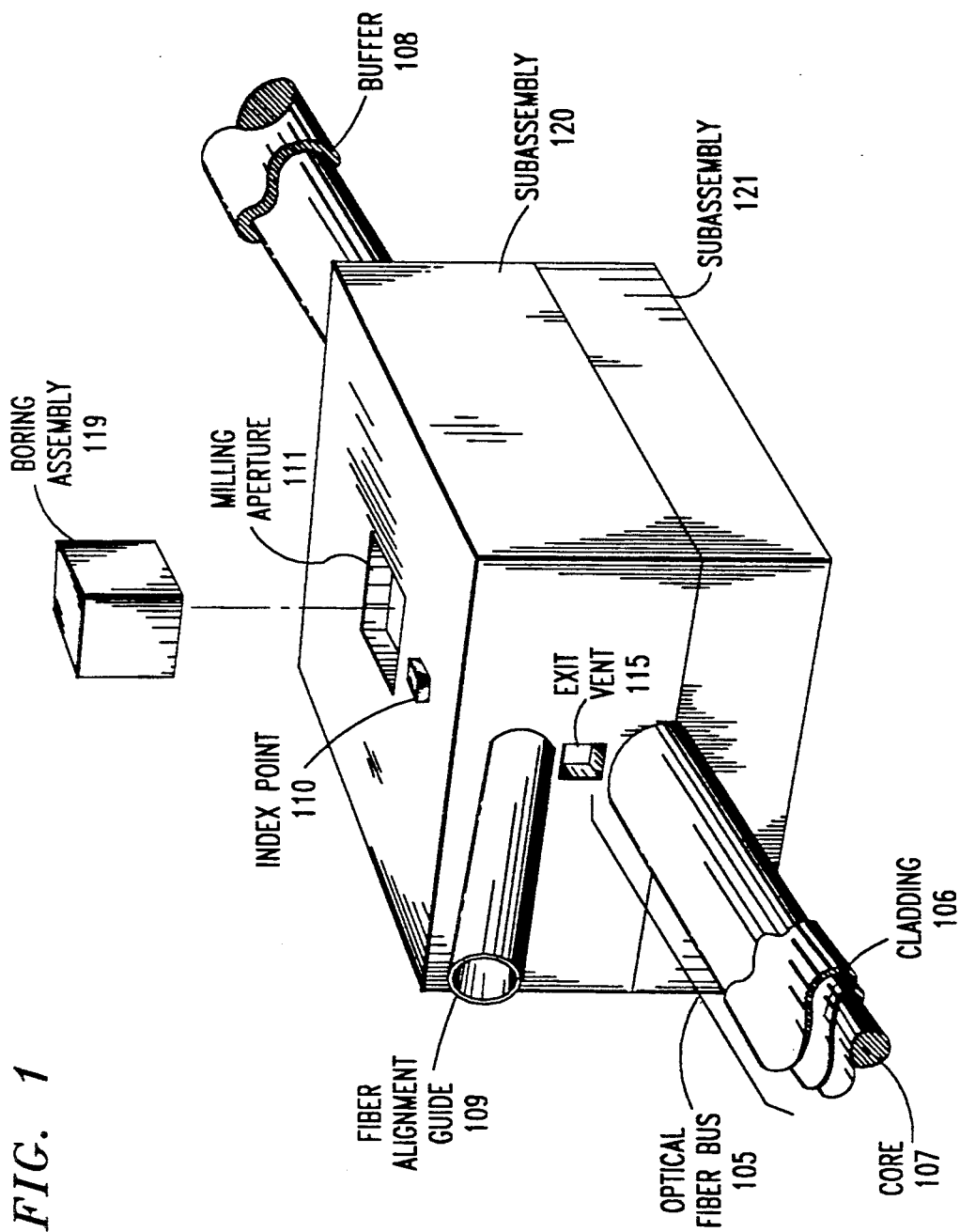
FIG. 1 illustrates an apparatus for fabricating an optical coupler in accordance with the present invention.
Figure 5:
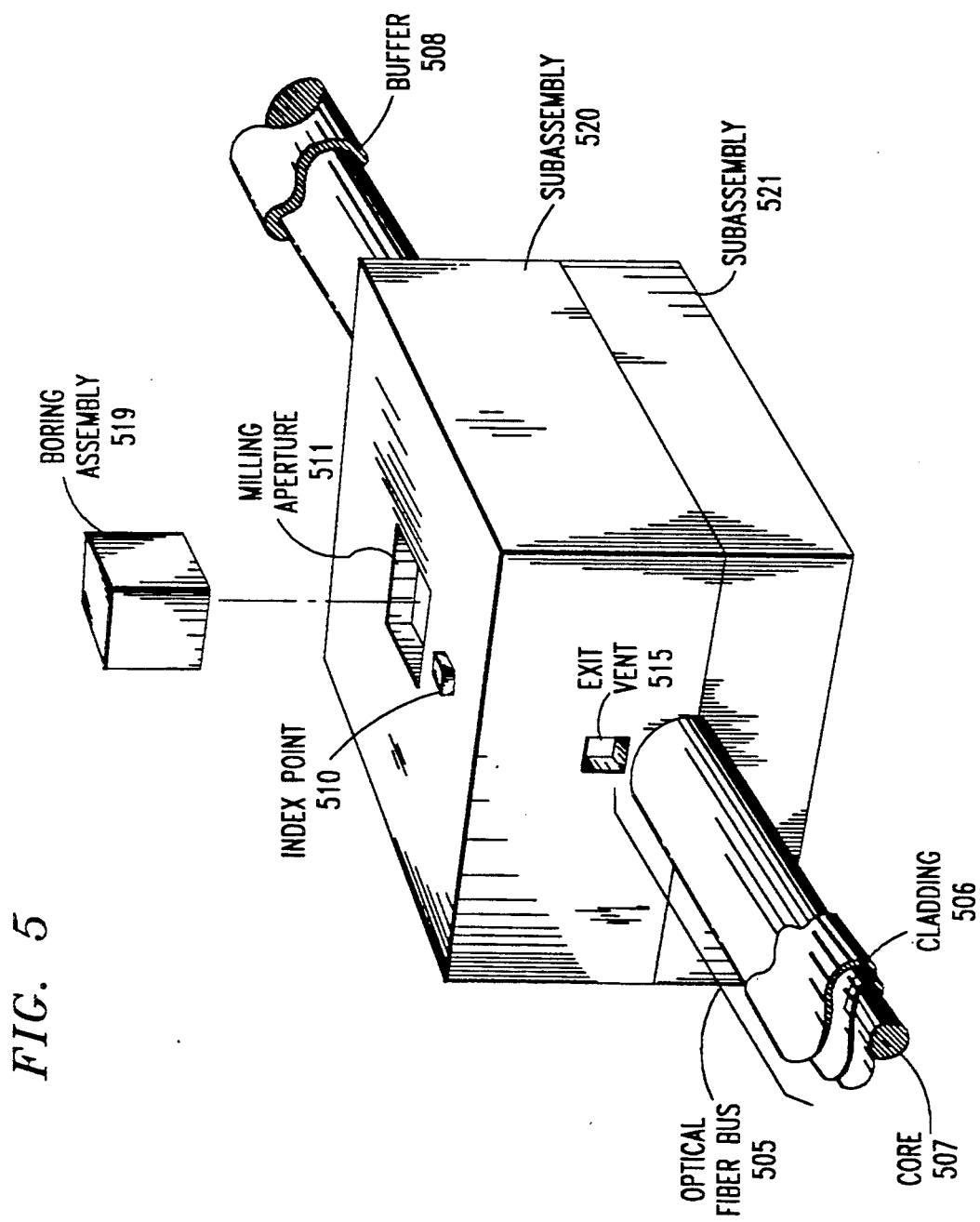
FIG. 5 illustrates an apparatus for fabricating an optical mode scrambler in accordance with present invention.

In accordance with the invention, a coupler opening or mode scrambler pattern is created in the cladding of an optical bus during optical component fabrication by ablatively removing the cladding using a radiation source such as an excimer laser. FIG. 1 illustrates an apparatus that fabricates couplers on an optical fiber bus in accordance with the invention, and FIG. 5 illustrates an apparatus that fabricates mode scramblers on the optical bus in accordance with the invention.

Because of the unique manner in which intense ultraviolet (UV) radiation effects a polymeric material, an excimer laser removes such a material by ablation rather than through thermal mechanisms such as melting or vaporization which are used by other types of lasers. When a polymeric material is irradiated by an excimer laser, numerous chemical bonds are broken. The resulting monomer products, regardless of their specific composition, have a larger specific volume than the original polymer, and the material explodes away from the irradiated region. A summary of the ablative mechanism of excimer lasers can be found in the article entitled "Excimer Lasers: An Emerging Technology in Materials Processing," by T. A. Znotins, "Lasers Focus-Electro-Optics," May, 1987.

Figure 2:
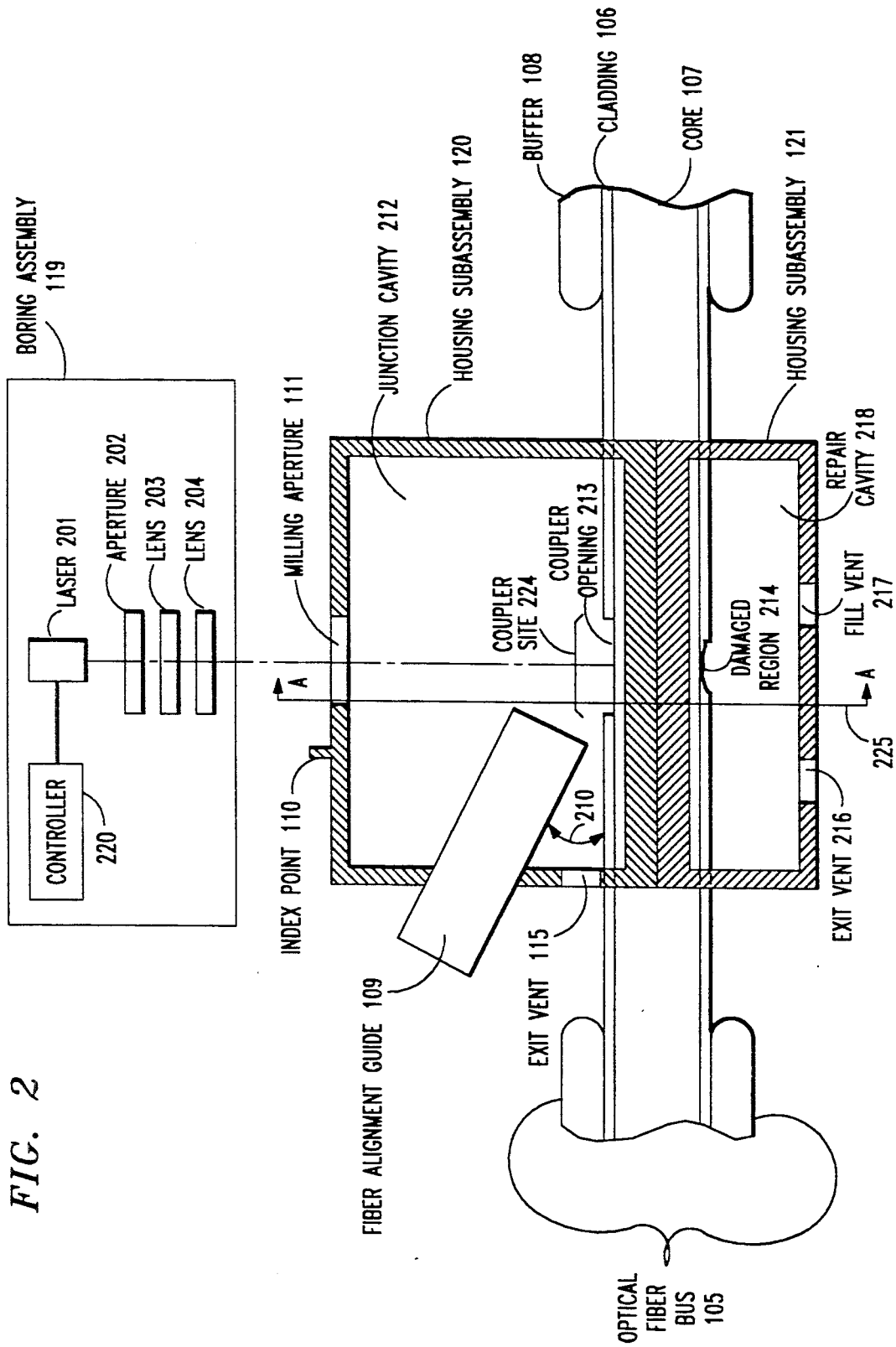
FIG. 2 illustrates a cross-sectional view of the apparatus of FIG. 1.
Figure 4:
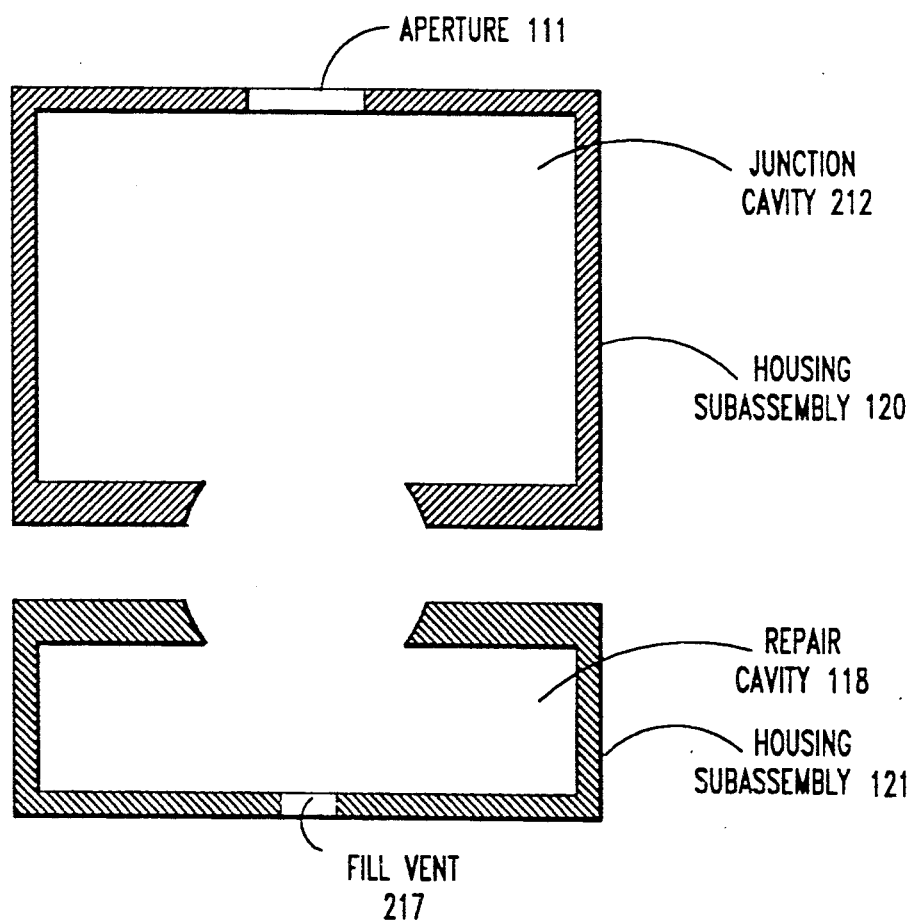
FIG. 4 illustrates a cross-sectional view of subassemblies 120 and 121 of FIG. 1.

A cross-sectional view of the apparatus of FIG. 1 is illustrated in FIG. 2. As illustrated in FIG. 2, buffer 108 is removed from a region of optical fiber bus 105, exposing cladding 106. In this exposed region, housing subassemblies 120 and 121 are attached resulting in a portion of the cladding of optical fiber bus 105 being totally surrounded by these two subassemblies. Details of the subassemblies are given in the cross-sectional view of FIG. 4. The subassemblies are secured to each other using conventional methods, such as gluing.

Figure 3:
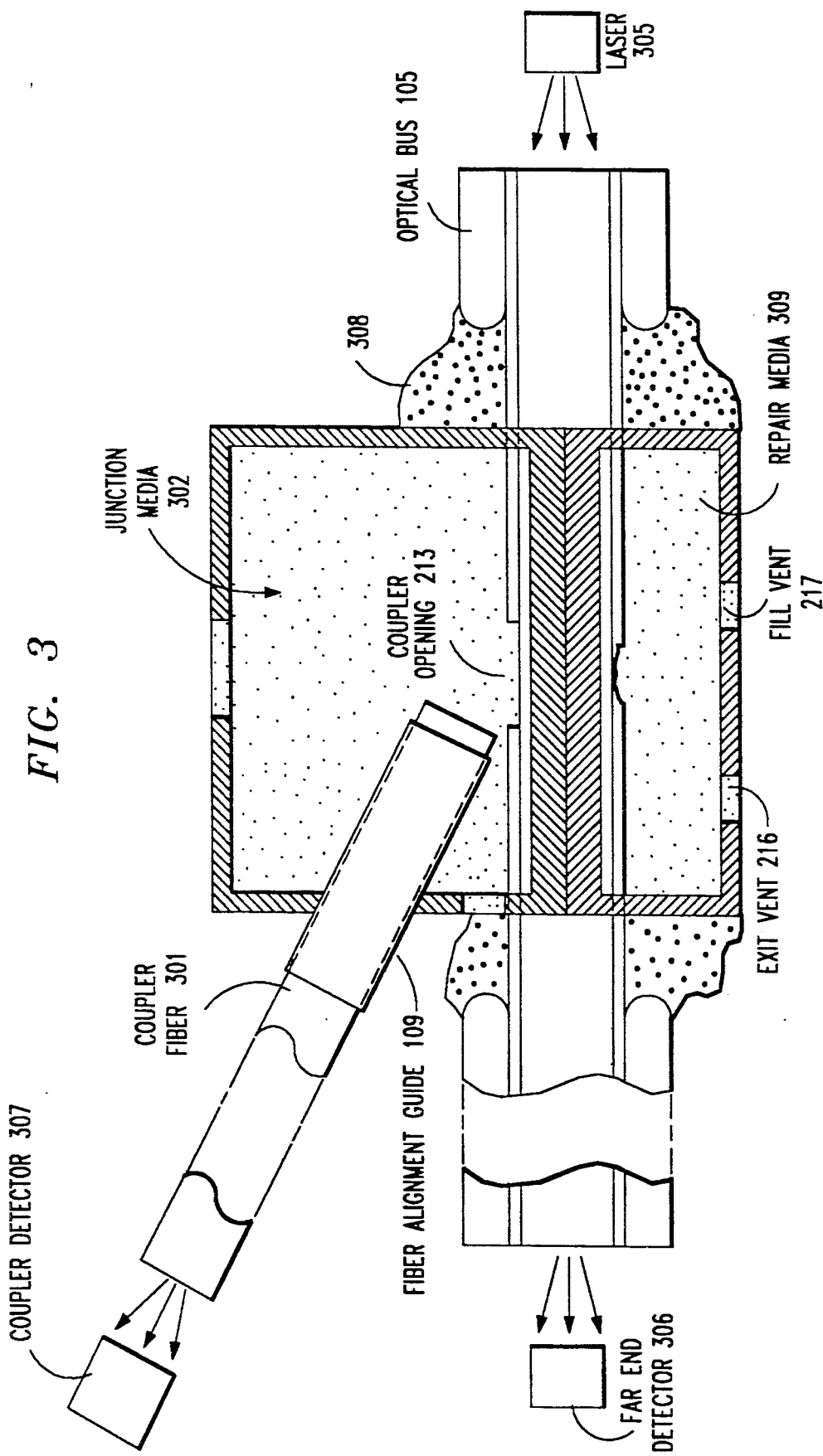
FIG. 3 illustrates an apparatus for measuring the performance of fabricated couplers.

As illustrated in FIG. 2, subassembly 120 provides milling aperture 111 which allows the laser beam of boring assembly 119 to pass through subassembly 120 to coupler site 224. In addition, subassembly 120 provides fiber alignment guide 109 which supports and aligns coupler fiber 301 as illustrated in FIG. 3. The latter fiber is inserted into fiber alignment guide 109 after coupler opening 213 is formed in cladding 106. Also, subassembly 120 includes index point 110, and controller 220 uses that index point to align boring assembly 119 with coupler site 224.

Once subassemblies 120 and 121 have been positioned and secured onto optical fiber bus 105, boring assembly 119 is properly aligned with coupler site 224 by controller 220, using conventional alignment procedures with reference to index point 110. Controller 220 controls excimer laser 201 to operate advantageously at a wavelength of 193 nanometers (nm) to ablate cladding material 106 from optical fiber bus 105 without damaging optical core 107. Laser 201 may advantageously be a Questek Model 2660 laser. The beam of laser 201 is advantageously first formed by aperture 202 and then imaged through a 4:1 telescope formed by lenses 203 and 204. The focal length of the lenses is adjusted for a wavelength of 193 nm. An image one-fourth the original size of the aperture is formed at the focal point of lens 204. This image results in a predefined pattern being projected on coupler site 224. For example, a 1 millimeter (mm) circular aperture forms a circular image of 250 microns at the focal point of lens 204. Laser 201 is operated in the pulse mode. The energy density at the coupler site is advantageously in the range of 5 to 10 milli-Joules/mm$^2$. At a repetition rate of one pulse/sec., approximately 40 to 80 pulses are required to produce circular holes with diameters of 250 microns and 625 microns, respectively. Optical core 107 is 1 mm in diameter; cladding 106 is a 10-15 micron thick organic cladding; and buffer 108 is a 200 micron thick organic coating. Illustratively, the optical core is glass, and cladding 106 is fluorinated acrylate.

After coupler opening 213 has been formed, coupler fiber 301 is inserted into fiber alignment guide 109 as illustrated in FIG. 3. After insertion of the coupler fiber, junction media 302 is injected into junction cavity 212 (illustrated in FIG. 2), completely filling the junction cavity. If light is to be extracted from coupler opening 213, the junction media has a higher index of refraction than core 107. If light is to be launched from the coupler fiber into core 107 via the coupler opening, the junction media has a higher index of refraction than cladding 106. The junction media is injected into junction cavity 212 via aperture 111 as illustrated in FIG. 2, and the air in the cavity is exhausted through exit vent 115. As illustrated in FIG. 3, junction media 302 not only transmits light to or from coupler fiber 301 but also physically secures the portion of coupler fiber 301 that extends from fiber alignment guide 109 into junction cavity 212.

During the ablation of coupler opening 213 by laser 201, some of the energy is transferred through core 107 damaging the cladding on core 107 opposite coupler opening 213. This impairment is illustrated as damaged region 214. Having substantially the same index of refraction as cladding 106, repair material 309 is injected into cavity 218 via fill vent 217. The air from repair cavity 218 is exhausted via vent 216. FIG. 3 illustrates that a damaged portion of buffer 108 can also be repaired with material 308.

FIG. 3 illustrates a measuring apparatus for determining the performance of fabricated couplers. Optical fiber bus 105 is excited with randomly polarized light from laser 305 which illustratively is a 633 nm HeNe laser with a 10 milliwatt rated output. A measurement is performed to determine the amount of light conducted from bus 105 to coupler fiber 301 via coupler opening 213 and junction media 302. The measurement of the coupler power output is made in reference to the light received at far end detector 306. This reference is reasonable since the amount of power extracted is very small compared with the total power in optical fiber bus 105. The reading at far end detector 306 is the 0 dB reference, and the light out of the coupler is a dB reading relative to the power exiting optical fiber bus 105. The 250 micron diameter holes result in a power output at coupler opening 213 in the range of $-24$ dB to $-25$ dB.

FIG. 5 illustrates an apparatus that fabricates an optical mode scrambler on an optical fiber bus in accordance with the invention. As illustrated in the cross-sectional view of FIG. 6, buffer 508 is removed from a region of optical fiber bus 505, exposing cladding 506. Optical fiber bus 505 is similar to optical fiber bus 105. In this exposed region, housing subassemblies 520 and 521 are attached resulting in a portion of the cladding of optical fiber bus 505 being totally surrounded by these two subassemblies. The subassemblies are secured to each other using conventional methods, such as gluing.

Figure 6:
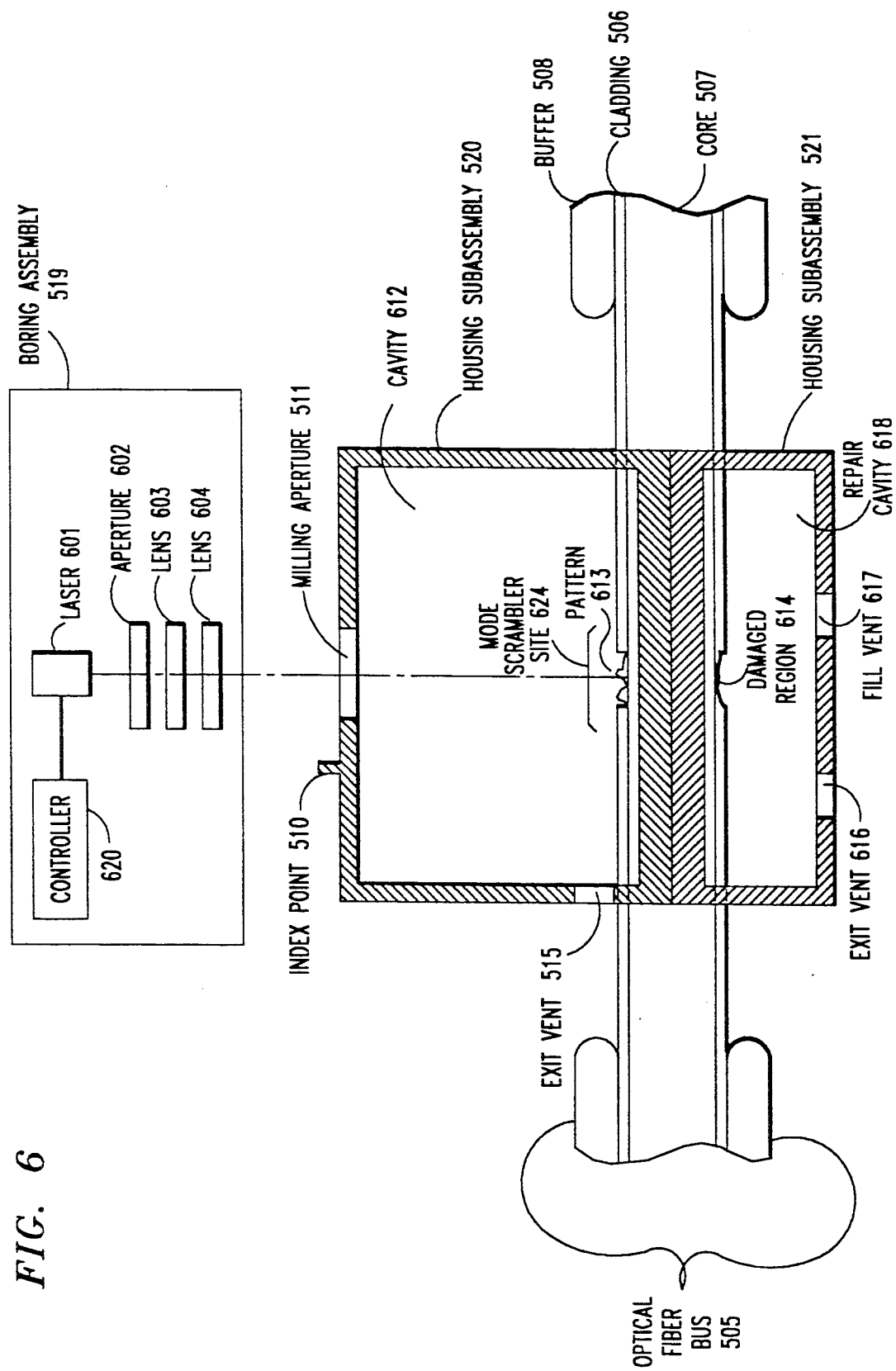
FIG. 6 illustrates a cross-sectional view of the apparatus of FIG. 5.

Once subassemblies 520 and 521 have been positioned and secured onto optical fiber bus 505, boring assembly 519 is properly aligned with mode scrambler site 624 by controller 620, using conventional alignment procedures with reference to index point 510. Subassembly 520 provides milling aperture 511 which allows the laser beam of boring assembly 519 to pass through subassembly 520 to mode scrambler site 624. This laser beam projects a predefined pattern onto site 624. FIG. 6 illustrates that mode scrambler pattern 613 has already been ablated by boring assembly 519. Mode scrambler pattern 613 may be similar to one of those disclosed in U.S. Pat. No. 4,676,594. After mode scrambler pattern 613 is formed, cavity 612 is filled with a material whose index of refraction is less than the cladding to preserve the light transmission characteristics of optical bus 505. During the ablative process, part of the energy striking mode scrambler site 624 passes through core 507 and damages the cladding illustrated as damaged region 614. To repair damaged region 614, subassembly 521 provides repair cavity 618 which is filled with a material having substantially the same refractive index as cladding 506.

Boring assembly 519 is identical to boring assembly 119 except that aperture 602 forms the laser beam from laser 601 into a mode scrambler pattern. Laser 601 operates at similar energy levels and pulse rates as previous described with respect to laser 201.

It is to be understood that the above-described embodiment is merely illustrative of the principles of the invention and that other arrangements may be devised by those skilled in the art without departing from the spirit and scope of the invention. Although an excimer laser has been used to ablative remove cladding, another suitable radiation source can be used. Other housings can be envisaged by those skilled in the art. An apparatus in accordance with the invention is not limited to the removal of cladding for making only coupler openings or mode scrambler patterns but can be used to make other types of optical components.

We claim:

1. A method of removing optical cladding from an optical core corresponding to a predefined pattern, comprising the steps of:
   forming radiation from a radiation source with an aperture to define said predefined pattern;
   focusing said formed radiation onto a site on the surface of said optical cladding on said optical core; and
   controlling the energy level of said radiation source so as to substantially ablate all of said cladding corresponding to said predefined pattern at said site.

2. The method of claim 1 wherein said predefined pattern defines an optical coupler opening and said step of controlling ablates an optical coupler opening in said optical cladding at said site.

3. The method of claim 2 wherein said optical core is of a material which is substantially unaffected by said radiation at said energy level.

4. The method of claim 3 wherein said radiation source is an excimer laser.

5. The method of claim 4 wherein said energy level is determined by pulsing said laser 40 to 80 times to form said site at a pulse repetition rate of one pulse per second with an energy of 5 to 10 milli-Joules/square millimeter at said site.

6. The method of claim 4 further comprising the step of repairing damage to a portion of said cladding opposite said site by radiation transmitted through said optical core from said site using a repair media having substantially the same index of refraction as said cladding.

7. The method of claim 1 wherein said predefined pattern defines an optical mode scrambler pattern and said step of controlling ablates an optical mode scrambler pattern at said site.

8. The method of claim 7 wherein said optical core is of a material which is substantially unaffected by said radiation at said energy level.

9. The method of claim 8 wherein said radiation source is an excimer laser.

10. The method of claim 9 wherein said energy level is determined by pulsing said laser 40 to 80 times to form said site at a pulse repetition rate of one pulse per second with an energy of 5 to 10 milli-Joules/square millimeter at said site.

11. The method of claim 9 further comprising the step of repairing damage to a portion of said cladding opposite said site by radiation transmitted through said optical core from said site using a repair media having substantially the same index of refraction as said cladding.

12. Apparatus for fabricating an optical component on an optical fiber, said optical fiber having cladding surrounding an optical core, said apparatus comprising:
a laser boring assembly;
a housing attached to said optical fiber;
said housing having a milling aperture that is aligned with a site on the surface of said cladding;
said laser boring assembly having a radiation source and an aperture to define a predefined pattern at said site by forming radiation from said radiation source;
lens for focusing said formed radiation through said milling aperture onto said site; and
controller for controlling the energy level of said radiation source so as to substantially ablate all of the cladding corresponding to said predefined pattern at said site.

13. The apparatus of claim 12 wherein said optical component is an optical coupler and said radiation ablates a coupler opening at said site.

14. The apparatus of claim 13 wherein said optical core is of a material which is substantially unaffected by said radiation at said energy level.

15. The apparatus of claim 14 wherein said radiation source is an excimer laser.

16. The apparatus of claim 14 wherein said housing comprises coupler fiber alignment guide for accepting a coupler fiber to provide proper alignment of said coupler fiber with said coupler opening thereby resulting in said optical coupler.

17. The apparatus of claim 16 wherein said housing further comprises a first and second subassembly with said first subassembly having said milling aperture and said coupler fiber alignment guide and said first and second subassemblies forming a cavity surrounding said site so that a junction media can be injected into said cavity through said milling aperture after the ablation of the cladding at said coupler site and said junction media allowing for the communication of light between said coupler fiber and said coupler opening.

18. The apparatus of claim 17 wherein said coupler fiber alignment guide allows said coupler fiber to extend out of said coupler fiber alignment guide and said junction media adheres to the extended part of said coupler fiber to physically secure said coupler fiber to said first subassembly.

19. The apparatus of claim 18 wherein said second subassembly positioned on the opposite side of said optical core from said site and said second subassembly forming a cavity surrounding a portion of said cladding opposite said site and having a fill vent so that a repair media can be injected into said cavity through said fill vent after the ablation of the cladding at said site so that said repair media can repair damage to said portion of said cladding opposite of said site resulting from radiation transmitted through said optical core from said site.

20. The apparatus of claim 19 wherein said controller determines said energy level by pulsing said laser 40 to 80 times to form said site at pulse repetition rate of one pulse per second with an energy of 5 to 10 milli-Joules/square millimeter at said coupler opening.

21. The apparatus of claim 12 wherein said optical component is an optical mode scrambler and said radiation ablates a mode scrambler pattern at said site.

22. The apparatus of claim 21 wherein said optical core is of a material which is substantially unaffected by said radiation at said energy level.

23. The apparatus of claim 22 wherein said radiation source is an excimer laser.

24. The apparatus of claim 23 wherein said housing further comprises a first and second subassembly with said first subassembly having said milling aperture and said first and second subassemblies forming a cavity surrounding said site so that a junction media can be injected into said cavity through said milling aperture after the ablation of the cladding at said site and said junction media preserving the light transmission characteristics of said optical core.

25. The apparatus of claim 24 wherein said housing comprises a first and second subassembly and said second subassembly positioned on the opposite side of said optical core from said site and said second subassembly forming a cavity surrounding a portion of said cladding opposite said site and having a fill vent so that a repair media can be injected into said cavity through said fill vent after the ablation of the cladding at said site so that said repair media can repair damage to said portion of said cladding opposite of said site resulting from radiation transmitted through said optical core from said site.

26. The apparatus of claim 25 wherein said controller determines said energy level by pulsing said laser 40 to 80 times to form said site at pulse repetition rate of one pulse per second with an energy of 5 to 10 milli-Joules/square millimeter at said coupler opening.

27. A housing adapted for use in the fabrication of an optical coupler on an optical fiber, said housing comprising
an assembly formed so as to define a) a first cavity that is in communication with a selected site on said fiber when said housing is attached to said optical fiber, b) a milling aperture through which a radiation beam can be focused onto said site, c) a second cavity that is in communication with a region of said optical fiber opposite to said site when said housing is attached to said optical fiber, and
a coupler fiber alignment guide disposed in said assembly in such a way that a coupler fiber inserted into said guide is aligned with said site.

28. The invention of claim 27 wherein said assembly is further formed so as to define a fill vent through which media can be injected into said second cavity.

29. A coupler for communicating optical energy into or out of an optical fiber said optical fiber being comprised of a core surrounded by a cladding, said coupler comprising
an assembly adapted to be attached to said optical fiber and formed so as to define a) a first cavity that is in communication with a selected site on said fiber when said housing is attached to said optical fiber, b) a milling aperture through which a radiation beam can be focused onto said site to ablatively remove a portion of said cladding to expose the underlying portion of said core, c) a second cavity that is in communication with a region of said optical fiber opposite to said site when said housing is attached to said optical fiber, a coupler fiber alignment guide disposed in said assembly in such a way that a coupler fiber inserted into said guide is aligned with said site, a coupler fiber inserted into said alignment guide, a body of junction media filling said first cavity which allows for the communication of light between said coupler fiber and said site and which physically secures said coupler fiber to said assembly, and a body of repair medium filling said second cavity, said repair media having substantially the same index of refraction as said core.

30. A housing adapted for use with a boring assembly in the fabrication of an optical coupler on an optical fiber, said optical fiber having cladding surrounding an optical core and said boring assembly including means for forming and focusing radiation onto a site on said cladding, said housing comprising:

first and second subassemblies attachable to said optical fiber to form said housing;

said first subassembly a milling aperture that is aligned with said site on the surface of said cladding and adaptable for said formed and focused radiation to pass through said milling aperture;

said first subassembly further comprising a coupler fiber alignment guide for accepting a coupler fiber to provide proper alignment of said coupler fiber with said coupler opening;

said first and second subassemblies further forming a cavity surrounding said site and adaptable so that a junction media can be injected into said cavity through said milling aperture after the ablation of the cladding at said coupler site and said junction media allowing for the communication of light between said coupler fiber and said site and said coupler fiber alignment guide allows said coupler fiber to extend out of said coupler fiber alignment guide; and said second subassembly adaptable for being positioned on the opposite side of said optical core from said coupler site and said second subassembly forming another cavity surrounding a portion of said cladding opposite said site and having a fill vent and adaptable so that a repair media can be injected into said other cavity through said fill vent after the ablation of the cladding at said site.

31. A housing adapted for use with a boring assembly in the fabrication of an optical mode scrambler on an optical fiber and said optical fiber has cladding surrounding an optical core and said boring assembly including means for forming and focusing radiation onto a site on said cladding, and said housing comprising:

first and second subassemblies attachable to said optical fiber to form said housing;

said first subassembly comprising a milling aperture that is aligned with said site on the surface of said cladding and adaptable for said formed and focused radiation to pass through said milling aperture;

said first and second subassemblies further forming a cavity surrounding said site and adaptable so that a junction media can be injected into said cavity through said milling aperture; and said second subassembly adaptable for being positioned on the opposite side of said optical core from said mode scrambler site and said second subassembly forming another cavity surrounding a portion of said cladding opposite said mode scrambler site and having a fill vent and adaptable so that a repair media can be injected into said other cavity through said fill vent after the ablation of the cladding at said site.

* * * * *